(12) United States Patent
Mihalos et al.

(10) Patent No.: US 8,926,308 B2
(45) Date of Patent: Jan. 6, 2015

(54) DOUGH EXTRUDERS AND METHODS

(75) Inventors: Mihaelos Nicholas Mihalos, Palisades Park, NJ (US); Chris E Robinson, Sparta, NJ (US); Jack Kitchell, West Milford, NJ (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 183 days.

(21) Appl. No.: 13/085,808

(22) Filed: Apr. 13, 2011

(65) Prior Publication Data

US 2011/0262611 A1    Oct. 27, 2011

Related U.S. Application Data

(60) Provisional application No. 61/326,373, filed on Apr. 21, 2010.

(51) Int. Cl.

| A21C 11/20 | (2006.01) |
| B29C 47/00 | (2006.01) |
| B29C 47/08 | (2006.01) |
| B29C 47/30 | (2006.01) |
| B29C 47/34 | (2006.01) |

(52) U.S. Cl.
CPC .............. *A21C 11/20* (2013.01); *B29C 47/0016* (2013.01); *B29C 47/0066* (2013.01); *B29C 47/08* (2013.01); *B29C 47/0806* (2013.01); *B29C 47/30* (2013.01); *B29C 47/34* (2013.01)
USPC ...... 425/382.4; 425/202; 425/207; 425/376.1; 425/382 R; 425/198; 426/516; 426/517

(58) Field of Classification Search
CPC .... A23L 1/0076; A23L 1/1805; A21C 11/16; A21C 11/20
USPC ............... 425/376.1, 380, 382 R, 382.4, 198, 425/131.1, 202, 208, 207, 264, 516; 426/448, 512, 516, 517
See application file for complete search history.

(56) References Cited

U.S. PATENT DOCUMENTS

| 4,212,840 A |   | 7/1980 | Cliff et al. |   |
| 4,752,205 A | * | 6/1988 | Moriyama et al. | ............ 425/465 |

(Continued)

FOREIGN PATENT DOCUMENTS

| EP | 0312391 A2 | 4/1980 |
| EP | 0162675 A3 | 11/1989 |

(Continued)

OTHER PUBLICATIONS

Extended European search report by European Patent Office dated Mar. 14, 2014 for Aplication No. 11163054.7 (6 pgs.).

*Primary Examiner* — Seyed Masoud Malekzadeh

(74) *Attorney, Agent, or Firm* — Fitch, Even, Tabin & Flannery LLP

(57) ABSTRACT

A dough extruder is disclosed that is configured to provide a continuous dough rope suitable for cracker products using a straight extended low friction compression chamber and a die plate oriented substantially perpendicular to a laminar flow of the dough. In one embodiment, the extruder can have a compressive force sufficient to extrude a plastic mass in a laminar flow in the range of about less than 120 psi; a compression chamber providing for an interior coefficient of friction in the range of about 0.2 and 0.35; and a die plate horizontally aligned with the longitudinal axis of the compressive force.

10 Claims, 9 Drawing Sheets

(56) References Cited

U.S. PATENT DOCUMENTS

| | | | |
|---|---|---|---|
| 4,790,996 A * | 12/1988 | Roush et al. | 426/458 |
| 4,795,647 A | 1/1989 | Leibfred | |
| 4,834,996 A | 5/1989 | Fazzolare et al. | |
| 4,837,112 A | 6/1989 | Calandro et al. | |
| 4,851,248 A | 7/1989 | Simelunas et al. | |
| 4,880,653 A | 11/1989 | Keller et al. | |
| 4,910,040 A | 3/1990 | Sagarino et al. | |
| 4,948,602 A | 8/1990 | Boehm et al. | |
| 4,949,630 A | 8/1990 | Knebl | |
| 4,959,240 A | 9/1990 | Aulik et al. | |
| 4,988,276 A | 1/1991 | Moeller | |
| 4,990,348 A | 2/1991 | Spratt et al. | |
| 5,035,906 A | 7/1991 | Persson et al. | |
| 5,061,507 A | 10/1991 | Aulik et al. | |
| 5,089,284 A * | 2/1992 | Irvin et al. | 426/557 |
| 5,120,559 A | 6/1992 | Rizvi et al. | |
| 5,149,555 A | 9/1992 | Flindall | |
| 5,205,206 A | 4/1993 | Kitama et al. | |
| 5,213,026 A | 5/1993 | House | |
| 5,223,296 A | 6/1993 | van der Wansem et al. | |
| 5,333,538 A | 8/1994 | Sawa | |
| 5,340,598 A | 8/1994 | Hay, Jr. et al. | |
| 5,350,589 A | 9/1994 | Weinstein et al. | |
| 5,382,443 A | 1/1995 | Kincaid et al. | |
| 5,447,348 A | 9/1995 | Lapierre | |
| 5,469,780 A | 11/1995 | Yamaguchi et al. | |
| 5,652,009 A | 7/1997 | Mair | |
| 5,681,605 A | 10/1997 | Takemori et al. | |
| 5,686,128 A | 11/1997 | Tracy et al. | |
| 5,695,804 A | 12/1997 | Hnat et al. | |
| 5,776,534 A | 7/1998 | Christensen et al. | |
| 5,783,241 A | 7/1998 | Bocabeille et al. | |
| 5,786,020 A | 7/1998 | Reimerdes et al. | |
| 6,054,166 A | 4/2000 | Dupart | |
| 6,180,158 B1 | 1/2001 | Zietlow et al. | |
| 6,197,355 B1 | 3/2001 | Zietlow et al. | |
| 6,267,998 B1 | 7/2001 | Bauman et al. | |
| 6,276,919 B1 | 8/2001 | Jensen et al. | |
| 6,296,465 B1 | 10/2001 | Deutsch et al. | |
| 6,309,686 B1 | 10/2001 | Zietlow et al. | |
| 6,338,867 B1 | 1/2002 | Lihotzsky Vaupel | |
| 6,375,997 B1 | 4/2002 | Sheen et al. | |
| 6,419,972 B1 | 7/2002 | Akimoto et al. | |
| 6,450,796 B1 | 9/2002 | Groff et al. | |
| 6,460,736 B1 | 10/2002 | D'Agostino | |
| 6,506,401 B1 | 1/2003 | Rothamel et al. | |
| 6,517,903 B1 | 2/2003 | Schmidt | |
| 6,626,660 B1 | 9/2003 | Olson et al. | |
| 6,712,595 B2 * | 3/2004 | Horna et al. | 425/133.1 |
| 6,753,023 B2 | 6/2004 | Hammond | |
| 6,830,768 B2 | 12/2004 | Neidlinger et al. | |
| 7,318,720 B2 | 1/2008 | Pabedinskas | |
| 2001/0001675 A1 | 5/2001 | Akutagawa | |
| 2002/0012722 A1 | 1/2002 | Prosise et al. | |
| 2002/0037352 A1 | 3/2002 | Messager et al. | |
| 2002/0071892 A1 | 6/2002 | Malfait | |
| 2002/0136812 A1 | 9/2002 | Degady et al. | |
| 2003/0008032 A1 | 1/2003 | Walker et al. | |
| 2003/0035876 A1 | 2/2003 | Kostival et al. | |
| 2003/0044489 A1 | 3/2003 | Waszyk et al. | |
| 2003/0143295 A1 | 7/2003 | Howsam | |
| 2003/0152667 A1 | 8/2003 | Goedeken et al. | |
| 2003/0215552 A1 | 11/2003 | Hashimoto et al. | |
| 2004/0037926 A1 | 2/2004 | Akimoto et al. | |
| 2004/0170751 A1 | 9/2004 | Roy et al. | |
| 2004/0197454 A1 | 10/2004 | Henry et al. | |
| 2005/0048180 A1 | 3/2005 | Moore et al. | |
| 2005/0136158 A1 | 6/2005 | Paparo | |
| 2005/0260317 A1 | 11/2005 | Cotten et al. | |
| 2005/0260326 A1 | 11/2005 | Kageyama et al. | |
| 2005/0266112 A1 | 12/2005 | Che | |
| 2005/0271785 A1 | 12/2005 | Hayes-Jacobson et al. | |
| 2006/0068062 A1 | 3/2006 | Newman | |
| 2006/0088641 A1 | 4/2006 | Wendel et al. | |
| 2006/0233937 A1 | 10/2006 | Nassar et al. | |
| 2006/0286271 A1 | 12/2006 | Villagran | |
| 2007/0031575 A1 | 2/2007 | Green et al. | |
| 2007/0098865 A1 | 5/2007 | Hosokawa | |
| 2007/0243301 A1 | 10/2007 | Barnett et al. | |
| 2008/0038416 A1 | 2/2008 | Burgess et al. | |
| 2008/0199569 A1 | 8/2008 | Baumeister et al. | |
| 2008/0199582 A1 | 8/2008 | Unger | |
| 2008/0241327 A1 * | 10/2008 | Hunter | 426/516 |
| 2009/0017169 A1 | 1/2009 | Assaad et al. | |
| 2009/0029018 A1 | 1/2009 | Elejalde et al. | |
| 2009/0123633 A1 | 5/2009 | Cleenewerck et al. | |
| 2010/0055284 A1 | 3/2010 | Karwowski et al. | |
| 2010/0209580 A1 * | 8/2010 | Unlu et al. | 426/516 |

FOREIGN PATENT DOCUMENTS

| | | |
|---|---|---|
| EP | 0340775 A1 | 11/1989 |
| EP | 0130748 B1 | 1/1990 |
| EP | 0163575 A2 | 2/1990 |
| EP | 0359375 A1 | 3/1990 |
| EP | 0230830 B1 | 4/1991 |
| EP | 0130772 B1 | 1/1992 |
| EP | 0181821 B1 | 1/1992 |
| EP | 0168255 B1 | 9/1992 |
| EP | 0510320 A1 | 10/1992 |
| EP | 0203771 B1 | 1/1994 |
| EP | 0614334 A1 | 9/1994 |
| EP | 0710448 A1 | 5/1996 |
| EP | 0770335 A1 | 5/1997 |
| EP | 0812545 A1 | 12/1997 |
| EP | 0874552 A1 | 11/1998 |
| EP | 0830067 B1 | 4/2000 |
| EP | 1036500 A1 | 9/2000 |
| EP | 1147715 A1 | 10/2001 |
| EP | 1219177 A1 | 7/2002 |
| EP | 1247454 A1 | 10/2002 |
| EP | 1443823 A1 | 8/2004 |
| EP | 1311166 B1 | 9/2006 |
| EP | 1119345 B1 | 4/2009 |
| GB | 2212096 A | 7/1989 |
| GB | 2228173 A | 8/1990 |
| GB | 2395164 A | 5/2004 |
| GB | 2453202 A | 4/2009 |
| JP | 64-047349 A | 2/1989 |
| JP | 3-210171 A | 9/1991 |
| JP | 4-262746 A | 9/1992 |
| JP | 5-064549 A | 3/1993 |
| JP | 5-308905 A | 11/1993 |
| JP | 6-78680 A | 3/1994 |
| JP | 6-209728 A | 8/1994 |
| JP | 6-276921 A | 10/1994 |
| JP | 7-322809 A | 12/1995 |
| JP | 8-276488 A | 10/1996 |
| JP | 9-51789 A | 2/1997 |
| JP | 9-140321 A | 6/1997 |
| JP | 9-191859 A | 7/1997 |
| JP | 9-239804 A | 9/1997 |
| JP | 10-179064 A | 7/1998 |
| JP | 10-191952 A | 7/1998 |
| JP | 11-046688 A | 2/1999 |
| JP | 11-075746 A | 3/1999 |
| JP | 2002-199871 A | 7/2002 |
| JP | 2002-325538 A | 11/2002 |
| JP | 2003-18970 A | 1/2003 |
| JP | 2003189787 A | 7/2003 |
| JP | 2003-333978 A | 11/2003 |
| JP | 2004-033113 A | 2/2004 |
| JP | 2004-166602 A | 6/2004 |
| JP | 2005-027586 A | 2/2005 |
| JP | 2005-151979 A | 6/2005 |
| JP | 2006-158282 A | 6/2006 |
| JP | 2006-211930 A | 8/2006 |
| JP | 2007-274914 A | 10/2007 |
| WO | 8806001 A1 | 8/1988 |
| WO | 90/14768 A1 | 12/1990 |
| WO | 90/14769 A1 | 12/1990 |
| WO | 91/04671 A1 | 4/1991 |
| WO | 93/10662 A1 | 6/1993 |
| WO | 94/02038 A1 | 2/1994 |

(56) References Cited

FOREIGN PATENT DOCUMENTS

| | | |
|---|---|---|
| WO | 96/04799 A1 | 2/1996 |
| WO | 97/25871 A1 | 7/1997 |
| WO | 99/53774 A1 | 10/1999 |
| WO | 00/04784 A1 | 2/2000 |
| WO | 01/03517 A1 | 1/2001 |
| WO | 02/28208 A1 | 4/2002 |
| WO | 03/039261 A1 | 5/2003 |
| WO | 03/086094 A1 | 10/2003 |
| WO | 03/105593 A1 | 12/2003 |
| WO | 2004/032636 A1 | 4/2004 |
| WO | 2005/027649 A2 | 3/2005 |
| WO | 2005/117601 A2 | 12/2005 |
| WO | 2006/138705 A1 | 12/2006 |
| WO | 2007/020345 A2 | 2/2007 |
| WO | 2008/012424 A2 | 1/2008 |
| WO | 2008/012424 A3 | 1/2008 |
| WO | 2008/040705 A1 | 4/2008 |
| WO | 2008/104709 A2 | 9/2008 |
| WO | 2008/142313 A1 | 11/2008 |
| WO | 2010034981 A1 | 4/2010 |

* cited by examiner

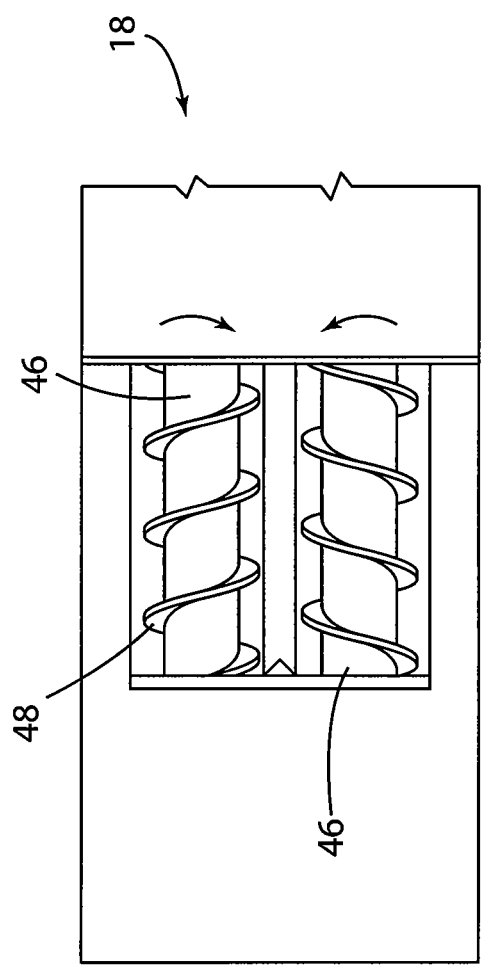

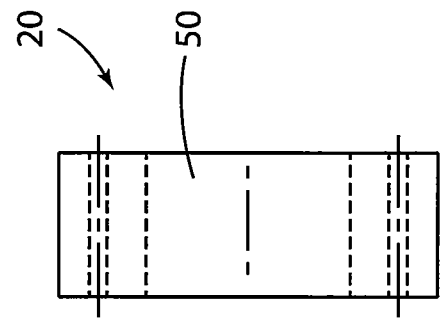
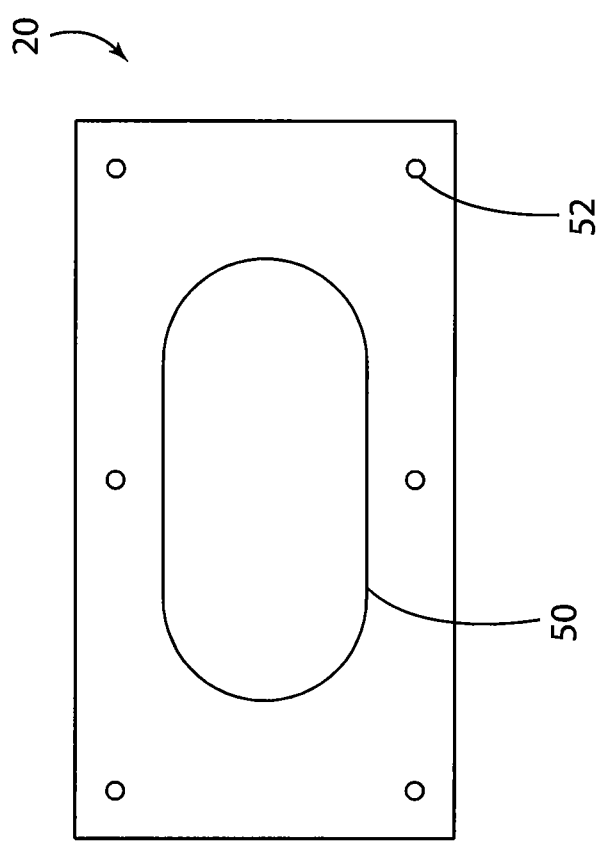

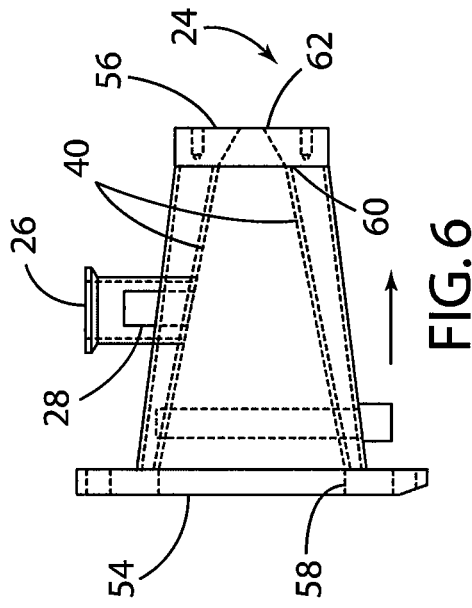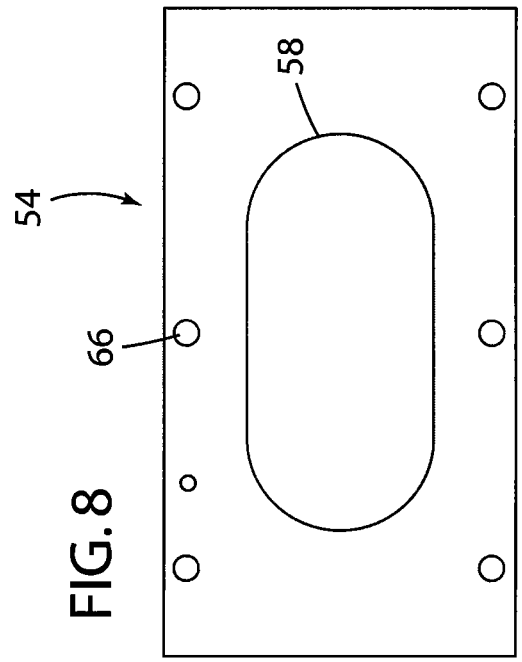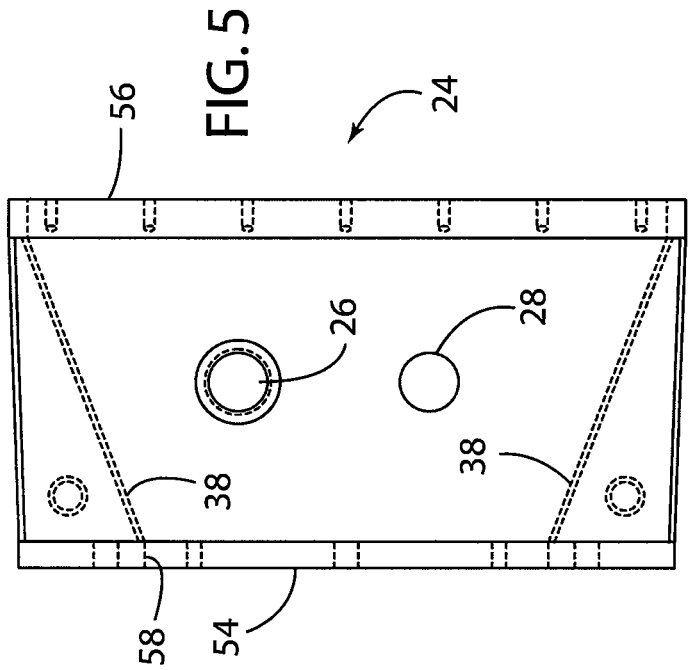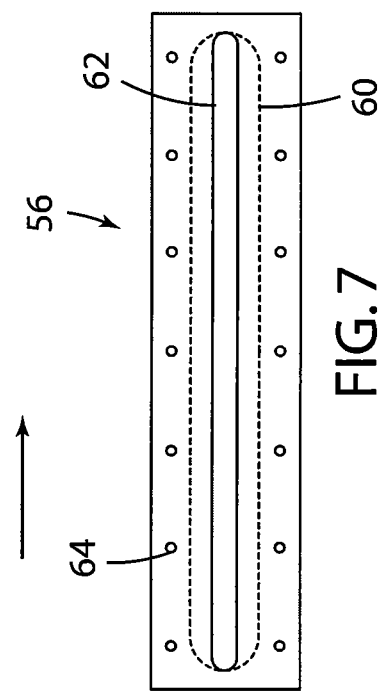

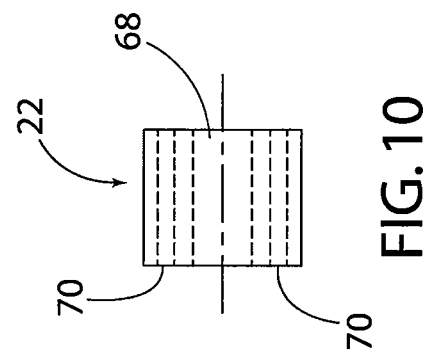
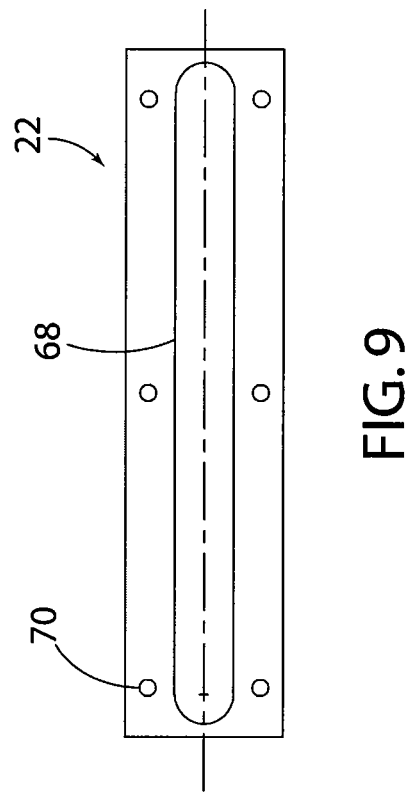
FIG. 10
FIG. 9

DOUGH EXTRUDERS AND METHODS

CROSS-REFERENCE TO RELATED APPLICATION

This application claims priority to U.S. Patent Appl. No. 61/326,373, filed Apr. 21, 2010, which is incorporated by reference in its entirety.

FIELD

The present embodiments relate to dough extruders and methods, and more specifically to dough extruders and methods that can provide a continuous dough rope suitable for cracker products using a straight extended low-friction compression head and a die plate oriented substantially perpendicular to a laminar flow of the dough.

BACKGROUND

Dough based products, such as crackers, are generally produced by mixing ingredients to form dough, sheeting and cutting the dough sheet into pieces, then baking the pieces. The products may be produced from a dough sheet in many different shapes and sizes. Some dough based products, such as pretzels, can be produced by extruding continuous ropes. These products are generally puffed, and highly expanded, and do not provide a leavened, cracker texture and laminar cell structure (See generally, U.S. Pub. No. 2010/0055284 to Karwowski et al., which is incorporated herein by reference).

Attempts at cracker dough extrusions produced at room temperature (See, U.S. Pat. No. 5,695,804 to Hnat et al.) are known in the art. However, dough variations in the quality and quantity of gluten in the flour can be problematic. These variations can sometimes be controlled through the additions of various non-proteinaceous oxidizing and/or reducing agents such as sulfite, cysteine, and reduced glutathione. These agents can make dough softer, stickier, and less elastic.

Variations in dough extrusion can also affect product characteristics. For example, U.S. Pat. No. 4,959,240 to Aulik et al. describes a process of relaxing a 'plastic mass', here a potato based mass, by uniformly pushing the mass at a substantially constant rate through multiple smooth bore passageways of varying pressure (though all less than about 85 p.s.i.g.) followed by a 'relaxation' chamber.

High extrusion pressures can also affect product characteristics due to a change in air cells in dough. Generally, the greater the pressure, the lesser the degree of expansion upon subsequent baking or frying and the harder the texture of the cracker or snack.

Other extrusion factors can also be considered. Overworking of the gluten or protein in the dough can result in a 'glassy' product texture, rather than a crisp, cracker-like texture. Further, high extrusion temperatures can also result in substantial gelatinization of the starch, which can also lead to a glassy product. Karwowski, et al. describes extrusion pressures of most preferably 20 to 60 psi and temperature range most preferably less than about 100° F. to reduce this glassy texture of the cooked cheese cracker product.

One other important component in the production of an extruded dough is the shape and depth of an extruder die. For example, an in-feed cone having a convex taper and tubular body for the land (where the dough exits the extruder) to reduce dough pressure and friction is known, but can cause damage to certain types of dough structure.

SUMMARY

Accordingly, there are provided herein embodiments that relate to dough extruders and methods, and specifically to dough extruders and methods that can provide a continuous dough rope suitable for cracker products using a straight extended low friction compression head and a die plate oriented substantially perpendicular to a laminar flow of the dough. The apparatus and methods can produce baked crackers or snacks having a non-glassy, crisp or crunchy cracker texture and a substantially uniform, un-puffed, leavened cracker cell structure from extrudable doughs without the need for high gluten content flours such as durum wheat or semolina.

In one form, an extruder is provided that includes a compression generator configured to extrude a plastic mass in a laminar flow in the range of about less than 120 psi; a compression chamber having an upstream opening to receive the plastic mass from the compression generator, at least a portion of an interior of the compression chamber having a coefficient of friction in the range of about 0.2 and 0.35; and a die plate attached to a downstream opening of the compression chamber, the die plate being horizontally aligned with the longitudinal axis of the compressive force and laminar flow of the plastic mass.

The die plate can have a plurality of lands across a front face and be oriented downstream of the compression generator at a distance to minimize turbulence and pulsing of the plastic mass while maintaining laminar flow and minimizing pressure drop, wherein the plastic mass exiting the lands maintains about 5 to 15 percent density uniformity of the extrusions across the front face. The orientation of the die plate can be determined by providing a first extension disposed between the compressive force and the compression chamber and a second extension between the compression chamber and the die plate, wherein each extension piece being about 40 to 60 percent of a length of compression chamber.

In one form, the extruder can provide a compression generator to provide a pressure in the compression chamber in the range of about 70 to 95 psi and can provide compressive force using a pair of augers rotating inwardly toward each other and out-of-phase.

In one form, the extruder can have a frame, a dough hopper, a pre-feed box and an auger box. The compression chamber can include an upstream extension and a downstream extension each having in inner perimeter comprised of a thermoplastic polyoxymethylene. Additional features can include a water jacket to maintain the temperature of the plastic mass in the range of about 90 to 130° F., preferably about 99° F.

In one form, the die plate of the extruder can include a plurality of die holes, the die holes having (in order of flow) a first straight taper, a second concave inward taper, and a land section, the land being at least as long as a diameter of its opening. The land can be about 50 percent of the thickness of the die plate.

In one form, a method can be provided using the present extruder including the steps of admixing dough ingredients to a moisture content in the range of about 17 to 35 percent weight; permitting about 30 to 180 minutes of lay time for the dough to rest; delivering the dough to the extruder; applying a compressive force to the dough extruder in the range of about 70 to 95 psi; maintaining the dough in the extruder at a temperature in the range of about 90 to 130° F.; and extruding a continuous dough rope in a laminar flow. Lay time can be in the range of about 45 to 60 minutes and the step of maintaining temperature of the dough can be at about 99° F.

In one form, the plastic mass extruded through the present extruder can have a moisture content in the range of about 17 to 35 percent by weight, and preferably about 27 to 33 percent by weight. Additionally, the plastic mass can further have sodium-metabisulfite in a range of about 0.005 to about 0.015 percent weight, or in a sodium-metabisulfite to flour ratio in the range of about 0.1 oz per 100 pounds to 1 oz per 100 pounds. Preferably, the plastic mass can has a sodium-metabisulfite to flour ratio in the range of about 0.4 oz to 100 pounds.

In another form, a baked cracker from an extrusion of the present extruder can be formed by conveying an extruded dough rope to a conveyor; cutting the dough rope into a dough piece of a desired length of the cracker; and baking the dough piece for 6 to 10 minutes to a temperature in a range of about 195 to 215° F.

In yet another form, a method for extruding a dough can include providing a dough having a water content of about 17 to about 35 weight percent; compressing the dough in an extruder to a pressure of about 70 to about 95 psi; passing the dough through a compression chamber of the extruder, at least a portion of the compression chamber having coefficient of friction of about 0.2 to about 0.35; and extruding the dough through a die in a laminar flow to produce a dough rope having a substantially uniform density, the die having a thickness and including a plurality of openings each having a land area length, the land area length being in the range of about 40 to about 60 percent of the die thickness.

Other features will become more apparent to persons having ordinary skill in the art to which pertains from the following description and claims.

BRIEF DESCRIPTION OF THE FIGURE

The foregoing features, as well as other features, will become apparent with reference to the description and figures below, in which like numerals represent elements, and in which:

FIG. 2 illustrates a top section view of an exemplary auger box of the extruder of FIG. 1, taken along section line A-A;

FIG. 3 illustrates a view of an upstream face of an exemplary upstream extension piece of a straight head compression section;

FIG. 4 illustrates a side view of an exemplary upstream extension piece of a straight head compression section perpendicular to the view of FIG. 3;

FIG. 5 illustrates a top view of a straight head compression section;

FIG. 6 illustrates a side view of the straight head compression section of FIG. 5;

FIG. 7 illustrates a side view of a downstream face of a downstream plate for a straight head compression section;

FIG. 8 illustrates a side view of an upstream face of an upstream plate for a straight head compression section;

FIG. 9 illustrates a face view of an exemplary downstream extension piece of a straight head compression section;

FIG. 10 illustrates a side view of the exemplary upstream extension piece of a straight head compression section of perpendicular to the view of FIG. 9;

DETAILED DESCRIPTION

Figure 1:
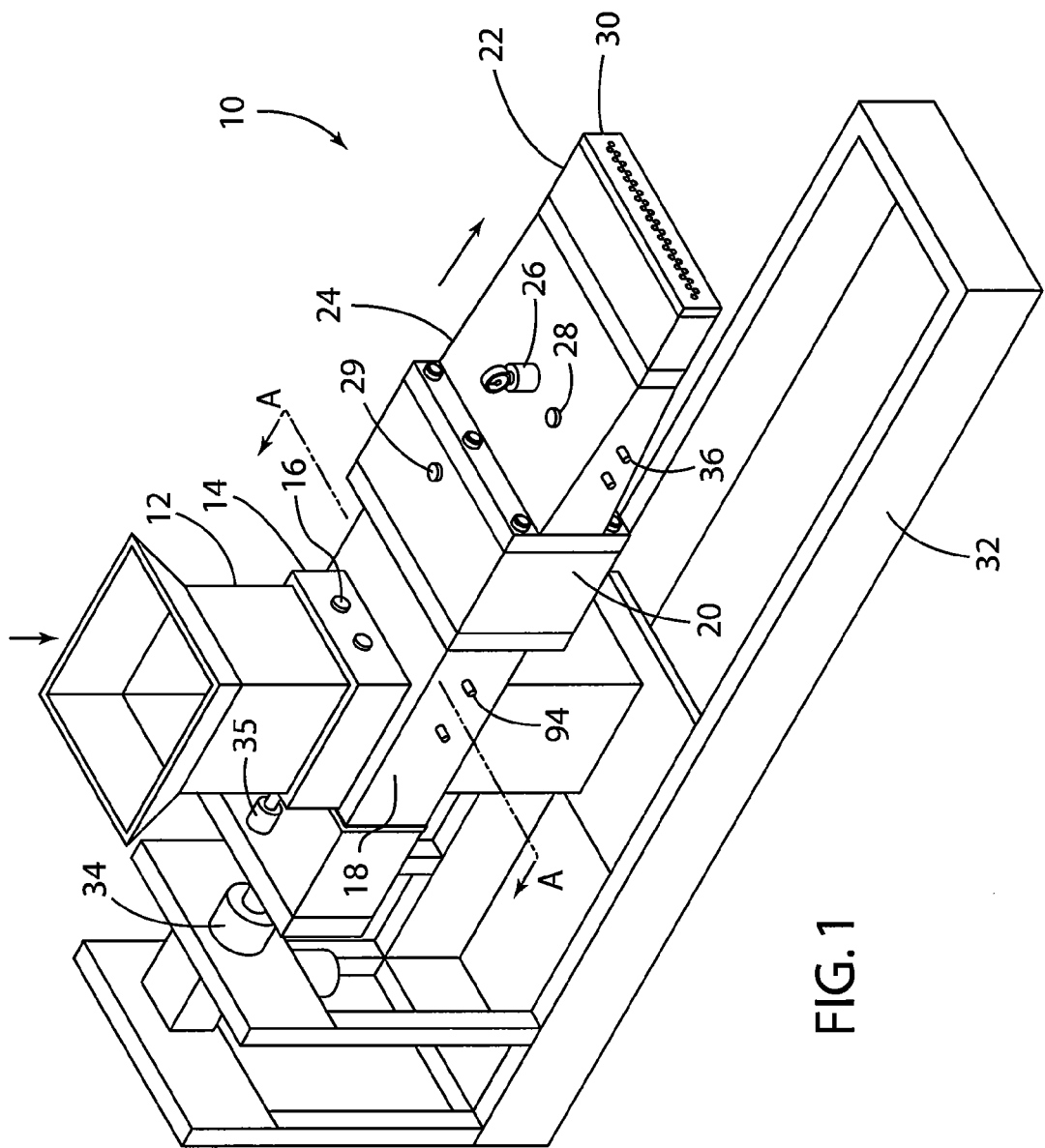
FIG. 1 illustrates a perspective view of an exemplary extruder.
Figure 11:
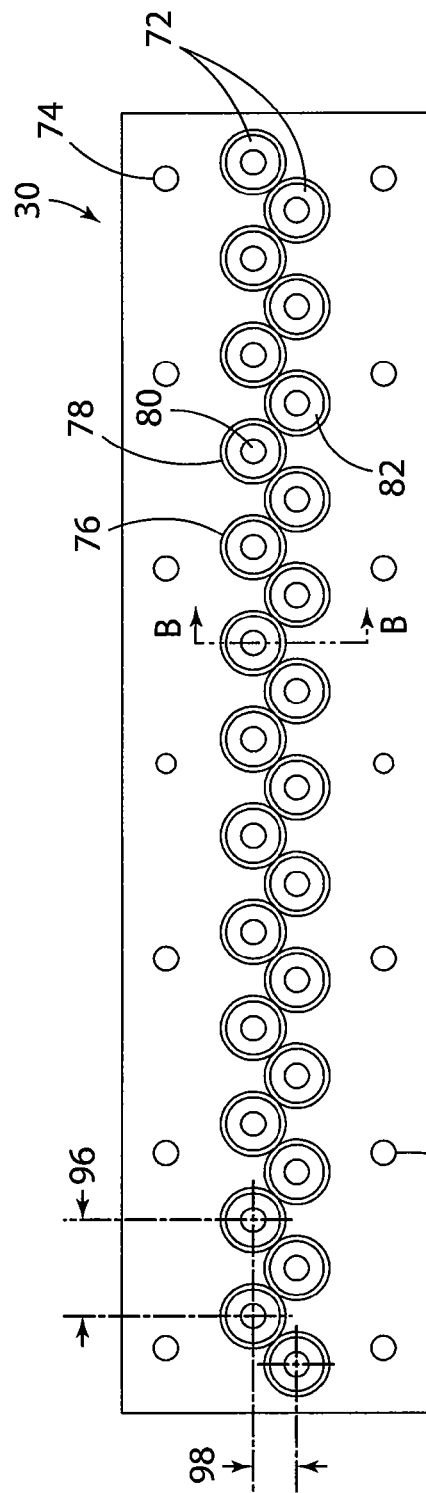
FIG. 11 illustrates a view (feed in) of an upstream face of an exemplary die plate of the present embodiments.
Figure 12:
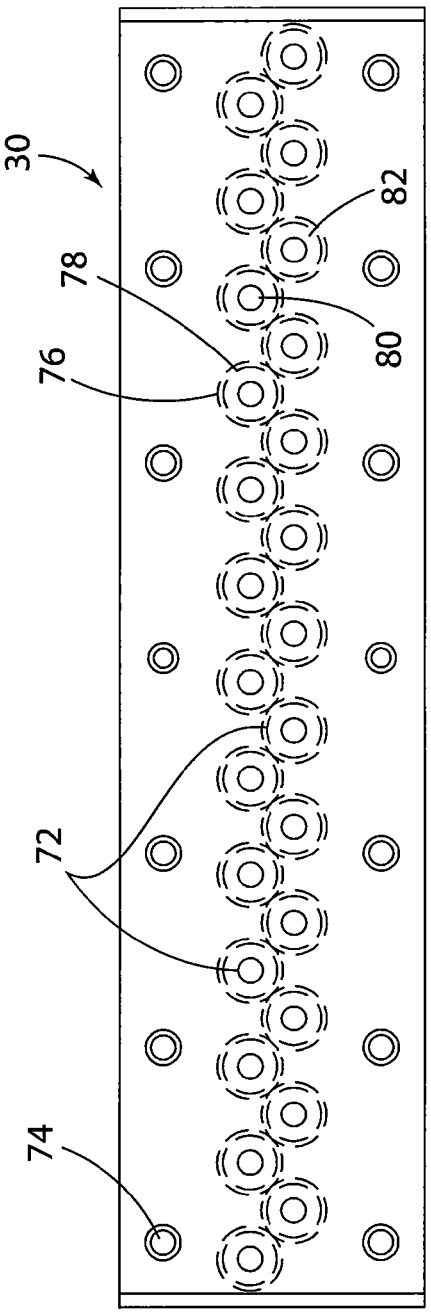
FIG. 12 illustrates a view (discharge) of a downstream face of an exemplary die plate.
Figure 14:
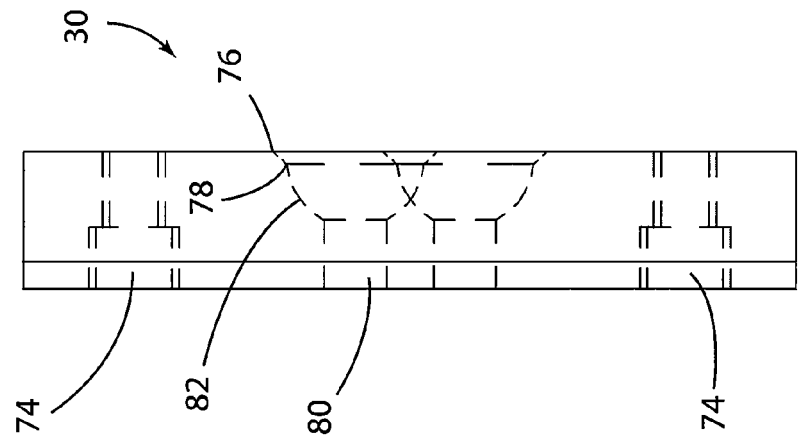
FIG. 14 illustrates a side view of an exemplary die plate perpendicular to the side view of FIG. 11.

The embodiments described below provide dough extruders and methods, and specifically dough extruders and methods that can provide a continuous dough rope suitable for cracker products using an extended low friction compression head and a die plate oriented substantially perpendicular to the laminar flow of the dough.

Generally, the present extruder embodiments can add extensions with low friction interior surfaces to the input and/or output of its compression chamber. The effect of the extensions increases compression chamber length, thereby increasing residence time of the dough in the chamber. This improves laminar flow, which reduces dough turbulence and allows dough pressure to equilibrate before it is extruded through a die plate. Further, by including at least a portion of the chamber with low friction surfaces, drag, and thus the pressure gradient across the extruder, may be lowered. Generally, dough pressure in the compression chamber should be less than about 120 psi, and preferably in the range of about 70 to 95 psi, and most preferably in the range of 90 to 95 PSI.

The present embodiments are shown using augers to generate the compressive force, though the dough may be alternately pumped using a displacement pump. In some embodiments pre-feed rollers (optionally corrugated) can deliver the dough from a hopper to the augers.

Also, the present embodiments allow a lowered dough temperature during extrusion than is typically known in the art. This improvement reduces or prevents damage to the dough starch and gluten chains, thus reducing the potential for a glassy texture to the final cooked dough based product.

Additionally, the present embodiments provide a novel die plate designed to have a narrower depth width (i.e., a shorter extrusion opening length in the die plate), and a two row staggered opening arrangement. The die plate extrusion openings can be highly polished with a concave inwards taper to facilitate laminar flow of the dough and to deduce pressure drop across the die face. Thus, the die plate is preferably horizontally aligned with the longitudinal axis of the screws and the laminar flow, unlike known die plates aligned generally diagonally to the laminar flow. The die plate insures uniform internal cell structure of that dough as it is extruded into continuous ropes.

The present embodiments may be suitable for any number of plastic masses. Preferably though, the present extruder embodiments may be used for food based doughs that are forced out of the die to form continuous shaped rope. As presented, the extruder may provide a 'laminar flow' for a cracker dough. In fluid dynamics, laminar flow can be defined as a flow regime characterized by high momentum diffusion and low momentum convection. In food based doughs, a good laminar flow and reduced pressure may provide for a finished cooked product that is crunchy, less dense and not glassy. In other words, the final product can provide organoleptic properties typically found for cracker products.

A typical cracker dough suitable for the present embodiments can be in the range of about 17 to 35 percent moisture, and preferably in the range of about 27 to 33, and most preferably about 30 percent moisture. It can be difficult to achieve a good laminar flow for this type of dough. Nevertheless, the cooked dough for the extruder of the present embodiments does not 'shatter' in a consumer's mouth (such as is typical for extruded pretzel dough based products). Pretzel dough can typically be about 30 to 45 percent moisture.

Further, the extruded dough of the present embodiments has a visually uniform internal cell structure. The dough flows through the extruder system without substantially overworking the gluten network/structure of the dough, which can result in a product that has fine uniformly sized bubble cells in the finished product. For example, when a dough is extruded, gluten strands align in the extrusion direction. If the extrusion pressure is too high (such as greater than 120 psi), a structural collapse or destruction of the cell structure can occur resulting in increased density of the dough. This translates to an undesirable hard, glassy, gritty texture in the final baked product. This is undesirable for cracker type product applications where a crisp, non-vitreous substantially homogeneous texture is preferred.

Thus, the presented combination of a high throughput, low pressure extrusion, with a resultant low pressure drop from the compression chamber to the die plate provides a minimized dough weight variation to approximately 0.7 grams per piece which has a targeted dough weight of 2.1 grams per piece for 2.5 inch length or 2.52 grams per piece for a 3.0 inch length dough stick.

Turning now to the figures, a twin auger (screw) extruder suitable for a plastic mass, such as a dough, is generally indicated at 10 in FIG. 1. The main components of extruder 10 can include a frame 32, a dough hopper 12, a pre-feed box 14, an auger box 18 (flight houses), a compression chamber 24 having an upstream (first) extension 20 and a downstream (second) extension 22, and a die plate 30. As shown in the Figure, the extensions about double the length of the distance from auger box 18 to die plate 30, each extension generally adding about 40 to 60 percent (and preferably about 50 percent) to each side of compression chamber 24. By way of illustration, upstream extension piece 20 can be about 4 inches in length, compression chamber 24 about 8.5 inches, and downstream extension piece 22 about 4 inches. In any event, the extensions are provided to extend the downstream distance from the generated compressive force to the front face of the die plate lands, as described below, to minimize turbulence and pulsing of the plastic mass while maintaining laminar flow and minimizing pressure drop. For example, it is preferable for the plastic mass to maintain about 5 to 15 percent density uniformity among the lands across the face of the die plate.

Figure 15:
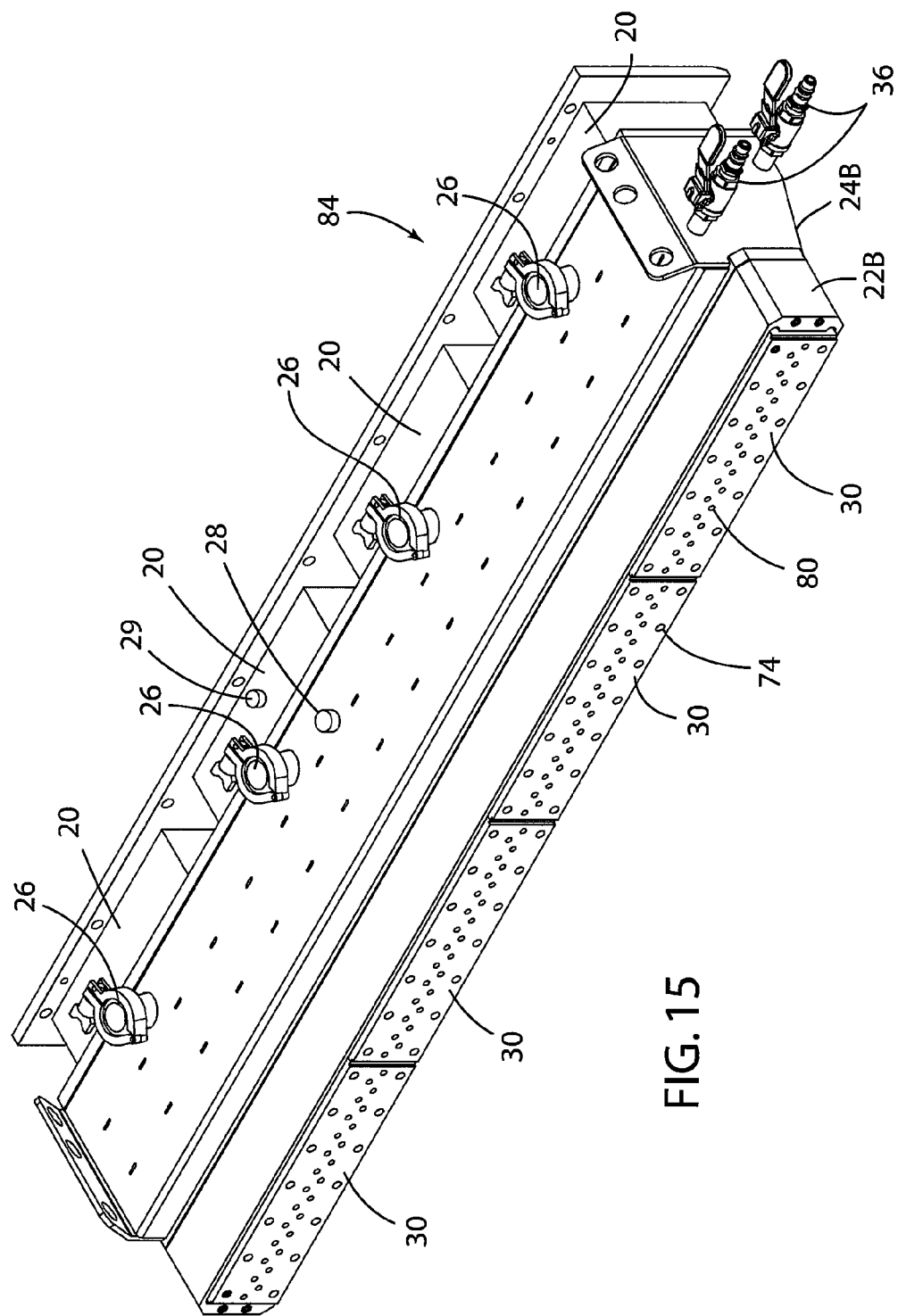
FIG. 15 illustrates a perspective view of an alternate embodiment of a straight multi-head compression section.
Figure 16:
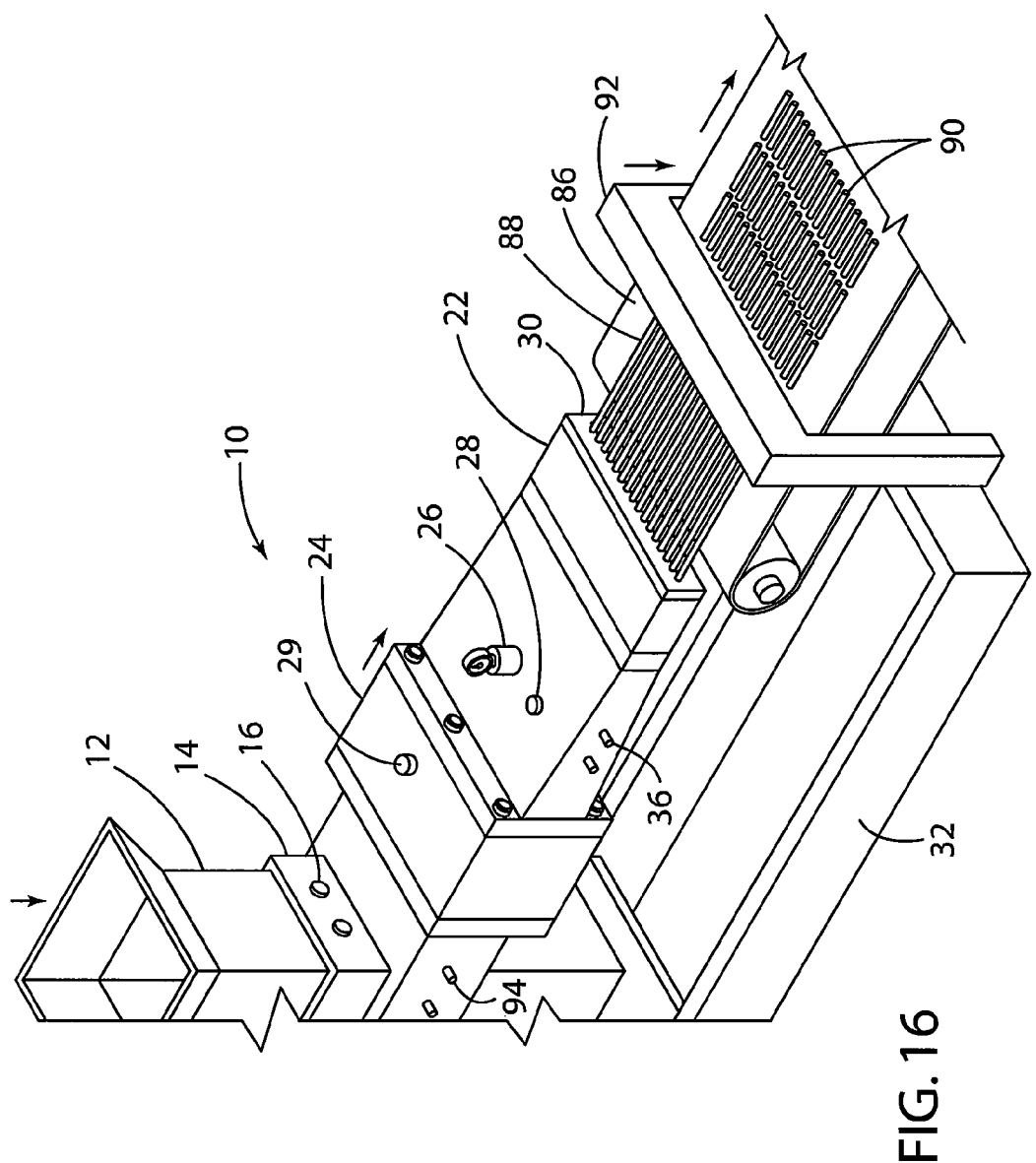
FIG. 16 illustrates a perspective view of the exemplary extruder of FIG. 1, showing extruded product and product cutting.

As shown in FIG. 16, extruded uncooked dough 88 can be delivered to a conveyor belt 86, traveling at substantially the same speed as the extrusions where it can be cut by a cutter 92 to provide a cut product 90, which is ready to deliver to an oven (not shown) for baking. Cutter 92 can be mechanical, such as a TEFLON coated spring steel blade or ultrasonic. An optional extruder embodiment shown in FIG. 15 shows an extruder having multiple compression modules generally shown at 84.

Specifically, as shown in FIG. 1, extruder 10 can receive an uncooked dough into hopper 12. On a multi compression head embodiments, such as shown in FIG. 15, multiple dough hoppers 12 can be present (not shown). Exemplary hopper 12 dimensions can be 12.5 inches square at the top tapering down to a dimension of 9.5 inches square at the bottom. Hopper 12 can be 20 inches in height.

From hopper 12, dough can be delivered to the optional pre-feed box 14. As shown in FIG. 1, pre-feed box 14 can have pre-feed rollers. The journals for pre-feed box 14 rollers are shown at 16. Pre-feed rollers can optionally be augers, made from polymers, and even corrugated to further work the dough as it moves through extruder 10. The pre-feed can be driven by a feed roller drive 35 and, in one form, can be operated up to about a maximum of 6 RPM.

Next, feed rollers can deliver dough to an auger box 18 to develop a compressive force to move the dough into compression chamber 24. As shown in FIG. 2, auger box 18 can have at least one auger 46 (two shown) having an auger fin 48. In embodiments where there are two augers 18, they are preferably rotated towards each other and out-of-phase to minimize dough pulsations. In one form, auger 46 can be around 4.0 to 4.5 inch in outer diameter. Auger box 18 can have an optional water jacket (cavity) to provide temperature regulation of the dough. Water can enter and exit the auger box water jacket at ports 94. Augers 46 can be driven by an auger drive 34 and operated at rate of up to a maximum of 35 RPM.

Next, the dough can be delivered by auger box 18 to compression chamber 24. Compression chamber 24 may include the upstream extension piece 20 and/or the downstream extension piece 22. The extension pieces 20 and 22 are low friction extension pieces and can be sized to provide the desired laminar flow for the dough to be extruded. In one embodiment, each extension 20 and 22 can be about 3 to 4 inches in length, compared to the compression chamber length of about 8.5 inches. The internal walls of the extension pieces 20 and 22, as well as the jacketed compression head chamber, should be manufactured as smooth as possible with non-restrictive transitions. The overall result of using the extension pieces 20 and 22 permits for a lower coefficient of drag on the raw dough. This in turn reduces frictional losses, which significantly lowers the pressure drop between the screws 46 and the die plate 30, which improves finished product texture and weight variation. The extension pieces 20 and 22 may reduce dough turbulence by providing additional residence time for the internal pressures of the compression chamber 24 to equilibrate prior to being extruded. The extension pieces 20 and 22 may allow a laminar flow of the dough, which significantly reduces dough chamber pressure (70 to 95 p.s.i. and preferably 90 to 95 p.s.i.) than typically found for this type of application.

In a preferred embodiment, an interior surface of extension pieces 20 and 22 has a low coefficient of friction through the use of various low friction materials such as a synthetic polymer. Specifically, embodiments can use a thermoplastic polyoxymethylene (commonly referred to as POM and also known as polyacetal or polyformaldehyde) to provide a low coefficient of friction. POM provides a high stiffness, low friction and dimensional stability.

An exemplary POM can be one sold under the trade name DELRIN, by DuPont. The extension pieces 20 and 22 can be made entirely of DELRIN, or lined with DELRIN. In any event, the low friction of the extension pieces 20 and 22 should provide a coefficient of friction preferably between 0.2 and 0.35, compared to, for example, the coefficient of friction of the rest of the extruder of 0.7 to 0.8. This can be accomplished through the interior surfaces made from stainless steel. FIGS. 3 and 4 illustrate an exemplary extension 20 and 22 that can have generally oblong perimeters 50 and 68 respectively with no taper. The thermoplastic polyoxymethylene reduces compression drop and improves laminar flow and reduces turberlance. It allows easy product run set up do to its ease of machinability.

Further, dough composition can also be adjusted by water, starch, and sodium metabisulphite (a starch expander) to increase dough lubricity to assure the coefficient of friction remains with the preferred range. For example, sodium metabisulphate can be in the range of about 0.005 to about 0.015 percent of dough weight. Alternately sodium metabisulphite can be a ratio in the range of about 0.1 oz per 100 lbs of flour to about 1 oz per 100 lbs of flour. In one preferred embodiment sodium metabisulphite can be about 0.4 oz per 100 lbs of flour. The low coefficient of friction reduces pressure drop and results in a less glassy texture of the cooked dough.

Additional aspects of an exemplary pressure chamber 24 between extensions 20 and 22 are more clearly illustrated in FIGS. 5 through 8. Here pressure chamber 24 (which can also be referred to as a jacketed straight head compression section) has an upstream back plate 54 (shown more clearly in side view in FIG. 8). The perimeter opening 58 for back plate 54 matches the perimeter of extension 20 and can be mounted to extension 20 using mounting holes 66. The body of compression chamber 24 can reduce the perimeter of the opening to receive dough through reductions 38 and 40 to match the back perimeter opening in the front plate 56 (See FIG. 7 at 60). Front plate 56 further reduces the dough flow perimeter (See FIG. 7 at 62).

Compression section 24 can also have an optional water jacket cavity to provide temperature regulation and maintenance of the dough. Water can enter and exit the compression section 24 at water jacket at ports 36. To maintain the desired temperature and pressure of the dough within the compression chamber, a temperature gauge (preferably positioned on the first extension 20 as temperature gauge 29 and alternatively positioned on compression chamber 24 as temperature gauge 28 (both shown) and pressure gauge 26 can be provided. The gauges can provide information to a controller (not shown) to regulate the flow and temperature of water within the jackets, and to drives 34 and 35 to regulate pressure. It is noted that the pressure gauge can be a diaphragm sensor so as not to affect laminar flow.

As illustrated in FIGS. 11-14, die plate 30 can receive compressed dough from extension 22 for extrusion. Reducing the thickness of the die plate 30 is related to reducing the pressure drop. The thickness (shown at 31 in FIG. 13) can, for instance, be reduced to less than 1.0 inches, such as 0.63 inches or less. In one form, die plate land 80 (i.e., the straight/parallel section through the extrusion die) can have a thickness of not less than 0.22 inches, preferably in the range of 0.25 to 0.31 inches, most preferably at 0.26 and 0.28 inches (shown at 33 in FIG. 13). As shown, two rows of extrusion holes 72 are shown in a staggered pattern, though many hole patterns are possible within the presented embodiments. Optionally, the hole diameter (shown at 35 in FIG. 13) can also vary across the array to allow for any pressure variation across the die plate face. In one approach, hole diameter 35 can range from about 0.24 inches to about 0.281 inches.

Figure 13:
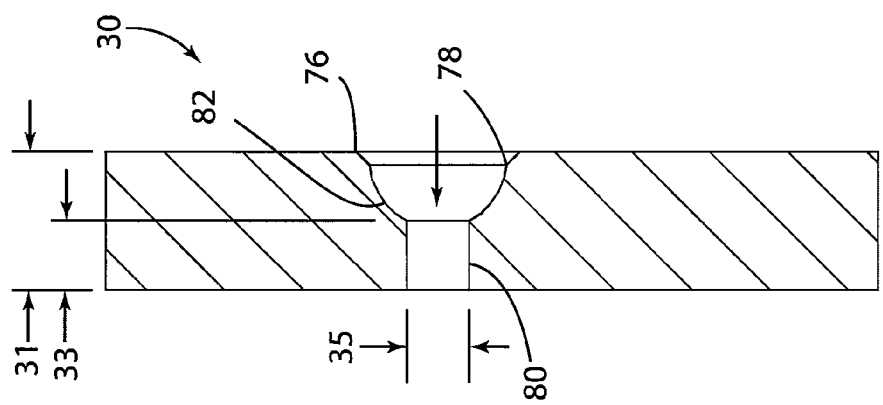
FIG. 13 illustrates a cross-sectional view of the exemplary die plate taken along section line B-B of FIG. 11.

As shown in FIG. 13, the present die holes 72 can have three different aspects to their respective geometries to provide desired laminar flow. In order of dough flow as indicated by the arrow in FIG. 13, an initial cone shaped straight taper 76 to 78 leading to a concave inward taper 82 followed by the land 80. As specifically illustrated, die plate 30 can be configured as a two row staggered pattern with 26 openings to maximize product loading into the oven as well as reducing the thickness of the die plate to a total depth of 0.625 inches, with land 80 representing about 50 of the thickness of the overall die plate 30. The die inlets are also highly polished to improve the pressure drop across the face of the die.

Typically the design of die openings 72 should account for the open area of the product extruded and the length and shape machined in the openings of the die plate 30. Surface texture of the product is a function of the orifice openings 72. The provided embodiments have a depth of a "land" area needed to form a laminar flow within the dough. If the dough does not achieve laminar flow, the dough tends to peel back at the orifice opening 72 resulting is a rough product surface. The land depth is typically as long as the width or diameter of the orifice opening 72.

Die plate 30 extrusion openings 72 can be a staggered pattern to maximize the number of openings 72. Further, the higher the number of die plate extrusion openings 72, the lower the pressure drop through the extruder 10. The limit is based on the spacing to the extruded dough ropes. For extruded dough products, the distance between the extruded dough ropes must be sufficient to allow proper spacing for even baking. The stagger (see dimension 96 and 98 in FIG. 11) is based on the feed in taper diameter 76. Die plate 30 is preferably oriented to be horizontal to the longitudinal axis of the augers 46 and the laminar flow. Thus, the orientation of dough ropes 88 is preferably horizontal (in line) to the laminar flow of the dough through the die plate 30 land.

The present embodiments require a dough that has a lubricity and moisture content to allow extrusion like a cracker dough. Table 1 provides exemplary dough embodiments suitable for use within the present embodiments.

TABLE 1

| | |
|---|---|
| SUGAR | 7.00% to 10.00% |
| STARCH | 1.00% to 4.00% |
| MONOCALCIUM PHOSPHATE (CAP) | 0.20% to 0.50% |
| SODA BICARBONATE POWDER | 0.10% to 0.20% |
| FLOUR | 52.00% to 66.00% |
| SEASONING | 1.50% to 4.00% |
| OIL | 1.50% to 4.00% |
| BROWN SUGAR | 0.50% to 2.00% |
| MALT SYRUP | 2.00% to 3.00% |
| AMMONIA BICARBONATE | 0.00% to 0.25% |
| SODIUM METABISULFITE | 0.005% to 0.015% |
| WATER | 17.00% to 35.00% |

In one approach, 0.4 oz per 100 lbs of flour of sodium metabisulfite is preferred. The exemplary dough provides a cracker like texture when tested under a three point bend measurement. The test measured the peak force needed to break a cracker stick cooked from dough extruded in an extruder 10 of the present embodiments. Supports for the test were set at 60 mm apart, top center to top center, with a test speed of 0.5 mm/sec, an auto trigger at 10 g force, and a test distance of 5 mm to failure.

Table 2 shows exemplary test conditions and Table 3, the results.

TABLE 2

| | |
|---|---|
| Variable 1 | Length-3.0" |
| | Diameter-0.25" |
| | Bake time-7 minutes |
| | Moisture-2.47 |
| Variable 2 | Length-3.0" |
| | Diameter-0.25" |
| | Bake time-7 minutes |
| | Moisture-1.37 |
| Variable 3 | Length-3.0" |
| | Diameter-0.25" |
| | Bake time-6 minutes |
| | Moisture-1.67 |

TABLE 3

| Sample | Break force Grams | Break force Std dev | Break force 95% conf | Break force 95% conf Lower Limit | Break force 95% conf Upper Limit |
|---|---|---|---|---|---|
| WTS v1 | 826 | 221 | 90 | 736 | 917 |
| WTS v2 | 698 | 237 | 93 | 606 | 791 |
| WTS v3 | 638 | 167 | 65 | 572 | 703 |

The following is an exemplary method to manufacture and extrude a dough according to the present embodiments. First, the dough ingredients (such as found in Table 1) can be admixed in a standard upright mixer. Upon mixing, the dough is placed in a dough trough or lay time conveyor for approximately 30 to 180 minutes (preferably about 45 to 60 minutes) of lay time (water hydration equilibration). The dough can then be transferred from the dough trough to hopper 12 of extruder 10.

In a multi-head extruder 10, such as found in FIG. 16, the dough is compressed using augers 46 into a homogeneous mass and extruded into 104 continuous ropes. Pre-feed augers can be located over each of the four sections of the extruder, which are used to minimize the weight variation by controlling the effect of head pressure and minimizing surges in the extrusion rate. The jacketed straight head compression chamber 24 and the jacketed auger box 18 can provide water to keep the dough temperature between 90 to 130° F. (and preferably about 99° F.). Pressure gauge 26 can monitor each compression head. Power monitors on augers 46 of each manifold tied to a control system and trended over time can track the dough 'batch to batch' variation in dough viscosity.

Once dough ropes 88 are formed, they can be deposited onto an extruder out feed conveyor 86, which is preferably designed with height adjustment. Next the ropes 88 are cut by cutter 92 to form dough pieces 90 (such as in 3 inch lengths) while maintaining length dough weight consistency across the conveyor and in the direction of product travel. During the cutting cycle, cutter 92 can slightly travel in the direction of travel prior to retracting to the up position to provide a uniform cut at the ends of the dough piece/stick.

Next, the product can be placed into an oven and baked, for example 6 to 10 minutes (preferably about 8 minutes) so that they emerge at a temperature in the range of about 195 to 215° F. (preferably about 212° F.).

The product can then be placed in an oiler or a tumbler where only a portion of the proper amount of oil will be applied. The cut baked pieces are then optionally salted or seasoned. It is noted though that seasoning preferably occurs at the mixing step.

Next, the cooked product can be cooled by using refrigerated cooling which is preferred to be around a product temperature of 90-110° F., then packaged.

While the products and methods have been described in conjunction with specific embodiments, it is evident that many alternatives, modifications, and variations will be apparent to those skilled in the art in light of the foregoing description.

We claim:

1. An extruder, comprising:
a compression generator configured to extrude a plastic mass in a laminar flow with a pressure in a range of less than 120 psi;
a compression chamber having an upstream opening to receive the plastic mass from the compression generator, wherein at least a portion of an interior of the compression chamber having a coefficient of friction in a range of about 0.2 and 0.35;
a die plate attached to a downstream opening of the compression chamber, the die plate being horizontally aligned with a longitudinal direction of a compressive force and the laminar flow of the plastic mass; and
wherein the die plate has a plurality of lands across a front face and is oriented downstream of the compression generator at a distance to minimize turbulence and pulsing of the plastic mass while maintaining the laminar flow and minimizing a pressure drop, wherein the die plate is configured to maintain about 5 to 15 percent density uniformity of the plastic mass across the front face of the die plate.

2. The extruder of claim 1, wherein an orientation of the die plate is determined by providing a first extension disposed between the compressive force and the compression chamber and a second extension between the compression chamber and the die plate, wherein a length of each extension piece is about 40 to 60 percent of a length of the compression chamber.

3. The extruder of claim 1, wherein the compression generator provides a pressure in the compression chamber in a range of about 70 to 95 psi.

4. The extruder of claim 1, wherein the compression generator comprises a pair of augers rotatable inwardly toward each other and out-of-phase.

5. The extruder of claim 1, further comprising a frame, a dough hopper, a pre-feed box and an auger box, wherein the compression chamber includes an upstream extension and a downstream extension each having an inner perimeter comprised of a thermoplastic polyoxymethylene.

6. The extruder of claim 1, further comprising a water jacket to maintain a temperature of the plastic mass in a range of about 90 to 130° F.

7. The extruder of claim 1, further comprising a water jacket to maintain a temperature of the plastic mass of about 99° F.

8. The extruder of claim 1, wherein the die plate has a plurality of die holes, the die holes having in order of flow, a first straight taper, a second concave inward taper, and a land section, wherein a land depth being at least as long as a diameter of a land opening.

9. The extruder of claim 8, wherein a land area length is about 50 percent of a thickness of the die plate.

10. The extruder of claim 1, wherein the die plate further is configured to extrude a plastic mass comprising sodium-metabisulfite in a range of about 0.005 to about 0.015 percent weight of the plastic mass.

* * * * *